United States Patent [19]

Rickman et al.

[11] Patent Number: 4,763,585

[45] Date of Patent: Aug. 16, 1988

[54] METHOD FOR THE COMBUSTION OF SPENT POTLININGS FROM THE MANUFACTURE OF ALUMINUM

[75] Inventors: William S. Rickman, Leucadia; James L. Kaae, Solana Beach, both of Calif.; Bernard W. Gamson, Potomac, Md.

[73] Assignee: Ogden Environmental Services, San Diego, Calif.

[21] Appl. No.: 93,919

[22] Filed: Sep. 8, 1987

[51] Int. Cl.⁴ .............................................. F23G 5/00
[52] U.S. Cl. ................................. 110/346; 110/232; 110/245; 110/345; 110/347
[58] Field of Search ............... 110/245, 346, 232, 347, 110/345

[56] References Cited

U.S. PATENT DOCUMENTS

| | | |
|---|---|---|
| 1,871,723 | 8/1932 | Morrow . |
| 2,732,283 | 2/1953 | Clukey et al. . |
| 4,053,375 | 10/1977 | Roberts et al. . |
| 4,113,832 | 9/1978 | Bell et al. . |
| 4,158,701 | 6/1979 | Anderson et al. . |
| 4,160,808 | 7/1979 | Anderson et al. . |
| 4,160,809 | 7/1979 | Anderson et al. . |
| 4,184,456 | 1/1980 | Taylor . |
| 4,241,670 | 12/1980 | Blaskowski . |
| 4,275,668 | 6/1981 | Daman . |
| 4,355,017 | 10/1982 | Gamson et al. . |
| 4,426,936 | 1/1984 | Kuo . |
| 4,434,726 | 3/1984 | Jones . |
| 4,444,740 | 4/1984 | Snodgrass et al. . |
| 4,474,119 | 10/1984 | Jones . |
| 4,597,774 | 7/1986 | Garcia-Mallol . |
| 4,640,204 | 2/1987 | Williams ............................ 110/347 |
| 4,690,076 | 9/1987 | Peletz, Jr. et al. .................. 110/347 |

FOREIGN PATENT DOCUMENTS

| | | |
|---|---|---|
| 843725 | 5/1984 | South Africa . |
| 2059403A | 8/1979 | United Kingdom . |

OTHER PUBLICATIONS

Report No. EPA-600/2-84-64 "Laboratory Feasibility Studies for the Fluidized-Bed Combustion of Spent Potlinings from Aluminum Reduction" by Kim et al. 3/84.

Primary Examiner—Edward G. Favors
Attorney, Agent, or Firm—Fitch, Even, Tabin & Flannery

[57] ABSTRACT

A process for the combustion of ground, spent potlinings generated during the production of metallic aluminum is disclosed. The process includes: grinding the potlinings to a particle size of not greater than about 2 inches in any dimension; mixing with the ground potlinings from about 1 to about 20 weight percent, based upon the weight of the potlinings, of a powdered inert additive having a median particle size of not greater than 10 micrometers, and burning the ground potlinings in a combustor at a temperature in the range of from 1400° F. to about 2200° F., the additive coating the ground potlinings and preventing their agglomeration in the combustion zone therein.

31 Claims, No Drawings

4,763,585

METHOD FOR THE COMBUSTION OF SPENT POTLININGS FROM THE MANUFACTURE OF ALUMINUM

FIELD OF THE INVENTION

This invention relates to a method for the combustion and disposal of spent potlinings which are generated from the manufacture of aluminum.

BACKGROUND OF THE INVENTION

Aluminum is conventionally manufactured by the electrolysis of alumina ($Al_2O_3$) which is reduced to metallic aluminum. The reduction is done in a bath of fused cryolite ($3NaF.AlF_3$). This reduction reaction is done in a pot with a carbonaceous potlining for the cryolite bath, the pot serving as the cathode in an electrolysis reaction at about 1600° F. to about 1800° F. During use over extended periods of time, the carbonaceous potlining of the pot gradually deteriorates, the carbonaceous lining material being penetrated by the materials in the pot which causes leakage of bath and aluminum metals.

Hundreds of thousands of tons of spent potlinings are generated each year in the production of aluminum. Spent carbonaceous potlinings, as a result of their use, deterioration and penetration by bath materials, contain significant quantities of fluorides as well as aluminum, alkali metals, nitrides, and some cyanide. Because spent potlinings comprise various materials which include such hazardous wastes such as fluorides and cyanide, the generation, storage and disposal of the potlinings have an environmental impact. Because a significant portion of spent potlinings is carbonaceous, the burning or the combustion of these spent potlinings is a logical way of meeting disposal problems. Indeed there are a number of such patents which are directed to this general concept, however, most of them such as U.S. Pat. No. 4,444,740 to Snodgrass et al. and U.S. Pat. No. 4,053,375 to Roberts et al. are concerned with either the alleviation of a potential environmental problem with the output of the combustor or with the recovery of some reusable material such as cryolite or fluorine from the potlinings.

Combustion of spent potlinings provides a highly efficient means for destroying the carbonaceous potlining, and cyanide therein as well as allows the fluoride salts to be more conveniently treated either in the combustor or in post-combustion processes. For example in connection with cyanide, at temperatures of about 1,400° F. cyanide is oxidized to $N_2$, $CO_2$ and nitrogen oxides. Stable combustion of spent potlinings has been found to require temperatures which exceed 1400° F. At these temperatures many potlining particles and ash therefrom exhibit agglomeration tendencies. Agglomeration results from salts such as alkali metal salts, halogen salts and silicon salts reacting and then melting at combustion temperatures. These reacting and melting salts create the conditions for the agglomeration of potlining particulates. Agglomeration of these particles inhibits their complete combustion. Moreover, agglomeration is deleterious to combustors and interferes with the ability of most combustors to continue to contact the potlining particles with air to continue stable combustion.

In fluidized-bed combustors and circulating bed combustors, agglomeration adversely affects the beds and their ability to contact potlinings with air for complete stable combustion. Indeed a report done for the United States Environmental Protection Agency by Battelle Columbus Laboratories (Report No. EPA-600/2-84-064, hereinafter "the Report") addresses the problem of agglomeration of potlinings in fluidized-bed combustors. The Report recognized agglomeration of potlining particles during combustion as an unsolved problem which the Report suggested could be addressed only by reducing the temperature of the combustor to below 1400° F. and accepting incomplete but "substantial" burning of the potlining. Moreover, while the Report discussed the use of kaolin clay with the ash from the combustion of spent potlinings, the Report did not suggest the use of kaolin clay or particulate additives with comminuted potlinings, as opposed to potlining ash, to completely combust spent potlinings at 1,400° F. or greater.

An object of the invention is to provide for the complete combustion of spent carbonaceous potlinings which are generated during the production of aluminum.

Another object of the invention is to prevent the agglomeration of comminuted carbonaceous potlinings during their combustion.

Another object of the invention is to provide a safe and ecologically sound process for disposing of spent potlinings without emitting deleterious materials into the environment.

Yet another object of the invention is to provide for the combustion of potlinings as a fuel source for the generation of thermal energy.

These and other objects of the invention will become more apparent with the following detailed description of the invention.

The invention is a process for the combustion of spent potlinings used in aluminum. The process comprises: grinding the potlinings to a particle size of not greater than about 2 inches in any dimension; mixing with the ground potlinings from about 1 to about 20 weight percent, based upon the weight of the potlinings of a powdered additive having a median particle size of not greater than 10 micrometers in any dimension; and burning the ground potlinings in a combustor at a temperature in the range of from about 1,400° F. to about 2,200° F., the additive physically coating the ground potlinings and preventing their agglomeration in the combustion zone of the combustor.

As used herein, spent potlinings are carbonaceous potlinings used in the conversion of aluminum oxide to metallic aluminum and which potlinings have begun to deteriorate or become penetrated by the materials contained in the potlining.

As used herein, combustor is a device with a chamber where combustion occurs.

As used herein, fluidized-bed combustion is a method of burning fuel in which the fuel is continually fed into a bed of reactive or inert particles supported by upflowing air which causes the bed to behave like a turbulent fluid.

A fluidized-bed combustor includes a chamber whose floor is slotted, perforated, or fitted with nozzles to uniformly distribute upflowing air. The chamber is partially filled with maximum-sized particles which fluidize at the airflow rate required for combustion. When fluidization takes place, the bed of material expands and exhibits the properties of a liquid. As air velocity increases, the particles mix more violently and the surface of the bed may take on the appearance of a boiling liquid.

As used herein, a circulating bed combustor is a type of fluidized-bed combustor wherein the fluidized-bed circulates or moves through more than one physical zone.

An important aspect of the invention is that high temperatures are used in the combustor for substantially complete combustion and destruction of the potlinings. Hence, the combustor may be used to burn the ground, spent potlinings at optimum conditions without agglomeration such that the carbon content of the ash from the combusted potlinings is not greater than about 5 weight percent of the ash in relatively short residence times in the combustor. In the process air is in the combustor in the range of from about 1 to about 10 seconds before it is swept from the combustion chamber with other exhaust gases. Small particles initially generally having a largest dimension of less than about 1/16 inch have a residence time in the combustion chamber in the range of from about 2 seconds to about 15 minutes before the residue is swept from the combustion chamber, such range preferably being from about 2 seconds to about 1 minute. Larger potlining particles having as their largest dimension, about 1/16 inch or greater, remain in the combustor loop and may have residence times in the combustor as great as 1 hour.

The additive is an inert particulate material. Inert particulate material means that the material does not melt at a temperature in the range from about 1,400° F. to about 2,200° F., does not chemically react with comminuted spent potlinings in that temperature range and does not change its chemical form if cofired with combustibles in that temperature range. Silicate minerals with relatively low amounts, such as about 10 weight percent or less based upon the weight of the mineral, of alkali metals including sodium and potassium and halogens including fluoride chlorides and iodides may serve as the additive. More specifically, kaolin clay and alumina silicates with about 38 or less weight percent aluminum and about 45 or more weight percent silica may be used as the additive. Fly ash and coal ash, the majority of which is in the form of refractory oxides such as lignite coal ash, also may be used as the additive. Further, lignite coal may be added to the combustor to provide the additive ash wherein the lignite coal has an ash content of at least about 20 weight percent.

The additive should not be so fine as to present handling and containment problems such as to cause large amounts of dust. The additive in a very fine particulate form, however, should not adversely affect the process of the invention. The median particle size in any dimension of the additive is in the range of from about 0.6 to about 5.0 micrometers. In the process from about 1 to about 20 weight percent additive, based upon the weight of the potlinings, may be used. Preferably from about 10 to about 15 weight percent additive, based upon the weight of the potlinings, is used in the process of the invention.

Comminuted spent potlinings are used in the process. After removal from the pots used in aluminum conversion, the potlinings are particularized or comminuted such as in a hammer mill, jaw crusher or any other means for particularizing relatively hard material. In the process of the invention, the potlining particles should be less than about two inches in any dimension. Preferably the median greatest dimension of the particles of the ground, spent potlinings is in the range of from about ¼ to about one inch with about ½ inch being most preferable.

Various combustors may be used in the process of the invention including fluidized-beds, circulating fluidized-beds, rotary kilns, rotary hearths, multiple hearths, cyclone type burners and other types of combustors suitable for the combustion of spent comminuted potlinings where agglomeration should be important. However, the process of the invention is particularly important to the burning ground, spent potlinings in fluidized-beds and circulating fluidized-beds because in these combustors agglomeration not only precludes complete combustion of the potlinings, it will be deleterious to the beds of the combustors.

Because during the combustion of the ground, spent potlinings, salts in the potlinings melt and/or react and thereby increase the tendency of the potlining particles to agglomerate, it is important to the process of the invention that the additive is mixed with the ground potlinings prior to combustion or at least prior to melting reaction or phase transition of the ground potlinings by virtue of exposure to elevated temperatures in excess of about 1400° F.

In an alternate form of the invention, additive which is not coated onto potlinings or is associated with ash from the burned ground potlinings are collected in a fabric filter bag house as they exit the combustion chamber with exhaust gases. The collected additive and ash then may be returned back to the combustor as additive for coating onto the ground, spent potlinings being conveyed into the combustor for burning. Further, depending on the amount of HF gas being emitted in the exhaust gases and how much of its removal is required or desired, HF scrubbers such as a dry alumina scrubber may be used in conjunction with the process of the invention if undesirable amounts of HF gas are being exhausted.

The following example is provided to illustrate the invention more fully; however, it should not be construed as limiting the scope of the invention, many variations of which are contemplated.

EXAMPLE I

A circulating bed combustor having a bed area with a 36 inch inside diameter is heated to 1,500° F. Ground, spent potlinings having a maximum size of about ½ inch are added into the inside of the combustion chamber through a side wall via a conveyor at a rate of 2,000 pounds per hour. A second conveyor is adjusted to convey kaolin clay having a median particle size of about 2 microns directs additive through the same side wall door and is adjusted to provide additive at about 20 weight percent based upon the weight of the potlinings being conveyed into the combustor. Air in the combustor has a residence time of about 2 seconds. The residence time of particles having a greatest dimension of 1/16 inch or more is about 1 hour. The lower portion of the combustion chamber is fitted with a screw conveyor to remove burned particles having a greatest dimension of 1/16 of an inch or more. The screw conveyor being operated at a rate of about 500 pounds per hour.

It should be understood that while certain preferred embodiments of the present invention have been illustrated and described, various modifications thereof will become apparent to those skilled in the art. Accordingly, the scope of the present invention should be defined by the appended claims and equivalence thereof.

Various features of the invention are set forth in the following claims.

What is claimed is:

1. A process for the combustion of potlinings used in aluminum production, the process comprising:
   grinding the potlinings to a particle size of not greater than about 2 inches in any dimension;
   mixing with the ground potlinings from about 1 to about 20 weight percent, based upon the weight of the potlinings, of a powdered additive having a median particle size of not greater than 10 micrometers, and
   burning the ground potlinings in a combustor at a temperature in the range of from 1400° F. to about 2200° F., the additive coating the ground potlinings and preventing their agglomeration in the combustion zone therein.

2. A process as recited in claim 1 wherein the additive is an inert material which does not melt at a temperature in a range from about 1400° F. to about 2200° F. and does not chemically react with the ground potlinings.

3. A process as recited in claim 1 wherein the additive is a silicate mineral with not more than 10 weight percent, based upon the weight of the mineral, of alkali metals and halogens.

4. A process as recited in claim 1 wherein the additive is kaolin clay.

5. A process as recited claim 2 wherein the combustor is a fluidized-bed combustor.

6. A process as recited in claim 2 wherein the median particle size of the ground potlinings is between about ¼ and about 1 inch and the median particle size of the additive is between about 0.6 and about 5 micrometers.

7. A process as recited in claim 2 wherein the additive is ash, the majority of which is in the form of refractor oxides.

8. A process as recited in claim 2 wherein from about 10 to about 15 weight percent of the powdered additive, based upon the weight of the potlinings, is mixed therewith.

9. A process as recited in claim 2 wherein the additive is a silicate mineral having less than about 10 weight percent alkali metals and halogens.

10. A process as recited in claim 2 wherein powdered additive which exits the combustion zone without being coated onto the ground potlinings is recovered and is recycled for mixing with said ground potlinings to be fed to said combustor.

11. A process in accordance with claim 2 wherein the carbon content of the ash from the combusted potlinings is not greater than about 5 weight percent.

12. A process in accordance with claim 3 wherein the combustor is a circulating bed combustor.

13. A process as recited in claim 3 wherein the combustor is a fluidized-bed combustor.

14. A process as recited in claim 3 wherein the median particle size of the ground potlinings is between about ¼ and about 1 inch and the median particle size of the additive is between about 0.6 and about 5 micrometers.

15. A process as recited in claim 3 wherein from about 10 to about 15 weight percent of the powdered additive, based upon the weight of the potlinings, is mixed therewith.

16. A process in accordance with claim 3 wherein the carbon content of the ash from the combusted potlinings is not greater than about 5 weight percent.

17. A process in accordance with claim 3 wherein the combustor is a circulating bed combustor.

18. A process as recited in claim 4 wherein the combustor is a fluidized-bed combustor.

19. A process as recited in claim 4 wherein the median particle size of the ground potlinings is between about ¼ and about 1 inch and the median particle size of the additive is between about 0.6 and about 5 micrometers.

20. A process as recited in claim 4 wherein from about 10 to about 15 weight percent of the powdered additive, based upon the weight of the potlinings, is mixed therewith.

21. A process as recited in claim 4 wherein powdered additive which exits the combustion zone without being coated onto the ground potlinings is recovered and is recycled for mixing with said ground potlinings to be fed to said combustor.

22. A process in accordance with claim 4 wherein the carbon content of the ash from the combusted potlinings is not greater than about 5 weight percent.

23. A process in accordance with claim 4 wherein the combustor is a circulating bed combustor.

24. A process as recited in claim 7 wherein lignite coal is added to the combustor with the ash, the coal and the ash having an ash content of at least about 20 weight percent based upon the weight of the coal and the ash together whereby the burning of said coal in the combustion zone of the combustor provides inert ash for coating said ground potlinings.

25. A process in accordance with claim 6 wherein the combustor is a circulating bed combustor.

26. A process in accordance with claim 11 wherein the combustor is a circulating bed combustor.

27. A process in accordance with claim 14 wherein the combustor is a circulating bed combustor.

28. A process in accordance with claim 16 wherein the combustor is a circulating bed combustor.

29. A process in accordance with claim 19 wherein the combustor is a circulating bed combustor.

30. A process in accordance with claim 22 wherein the combustor is a circulating bed combustor.

31. A process in accordance with claim 20 wherein the combustor is a circulating bed combustor and the median particle size of the ground pot linings is between about ¼ inch to about 1 inch and the median particle size of the additive is between about 0.6 and 5 micrometers.

* * * * *